United States Patent [19]

Yeh

[11] Patent Number: 4,754,506

[45] Date of Patent: Jul. 5, 1988

[54] JOINT CONNECTOR FOR HEADBOARD OF SOFA BED OR DAYBED

[76] Inventor: Jen Z. Yeh, 660 S. Aberdeen, Anaheim Hills, Calif. 92807

[21] Appl. No.: 53,005

[22] Filed: May 22, 1987

[51] Int. Cl.⁴ .................. A47C 17/02; A47C 19/02
[52] U.S. Cl. ................................. 5/53 R; 5/201;
 5/282 R; 403/205; 403/403
[58] Field of Search ........... 5/53 R, 54, 282 R, 285,
 5/183, 51 B, 132, 201, 425; 403/205, 403, 174, 178

[56] References Cited

U.S. PATENT DOCUMENTS

| | | | |
|---|---|---|---|
| 1,264,227 | 4/1918 | Uhl | 5/282 R |
| 1,316,155 | 9/1919 | Harrison et al. | 403/205 |
| 2,117,798 | 5/1938 | Gasciogne et al. | 403/174 |
| 4,651,362 | 3/1987 | Alperin et al. | 5/53 R |
| 4,679,261 | 7/1987 | Stanley et al. | 5/53 R |

FOREIGN PATENT DOCUMENTS 5576 of 1902 United Kingdom .................. 5/285

Primary Examiner—Alexander Grosz
Attorney, Agent, or Firm—Francis X. LoJacono

[57] ABSTRACT

A headboard for a sofa bed or a daybed wherein the headboard is defined by a pair of oppositely disposed and aligned half sections mounted together by means of a pair of substantially "T" shaped connectors to form an elongated headboard adapted to be attached to a bed structure which includes oppositely positioned side boards, the connector having a pair of horizontally aligned bores to receive the free ends of the upper and lower rail members of each half section, there being a third centrally located perpendicular bore formed to receive a vertical strut between the pair of "T" shaped connectors.

2 Claims, 2 Drawing Sheets

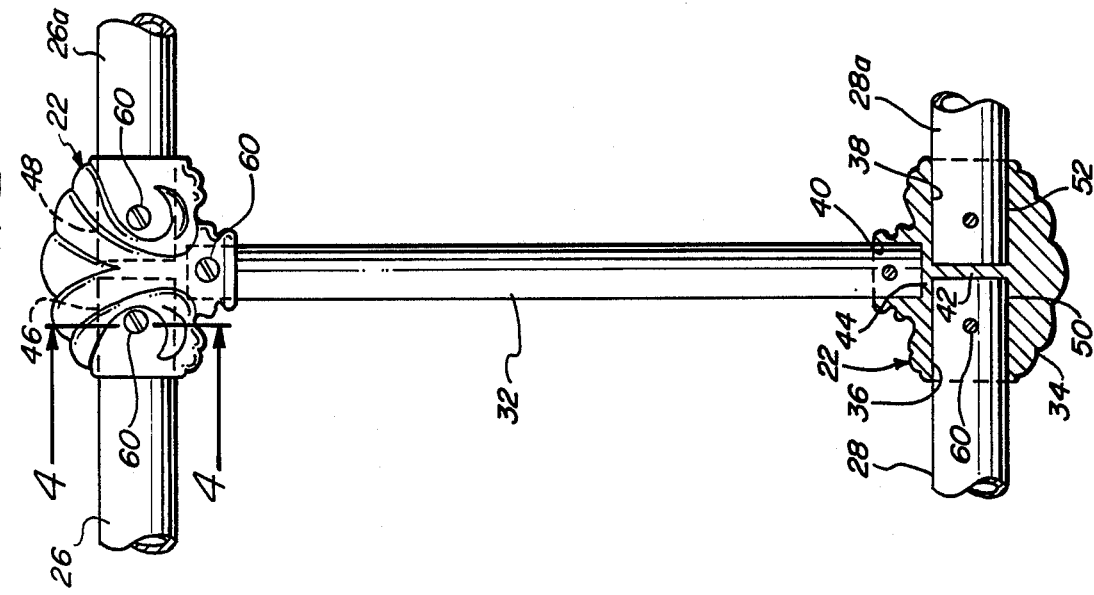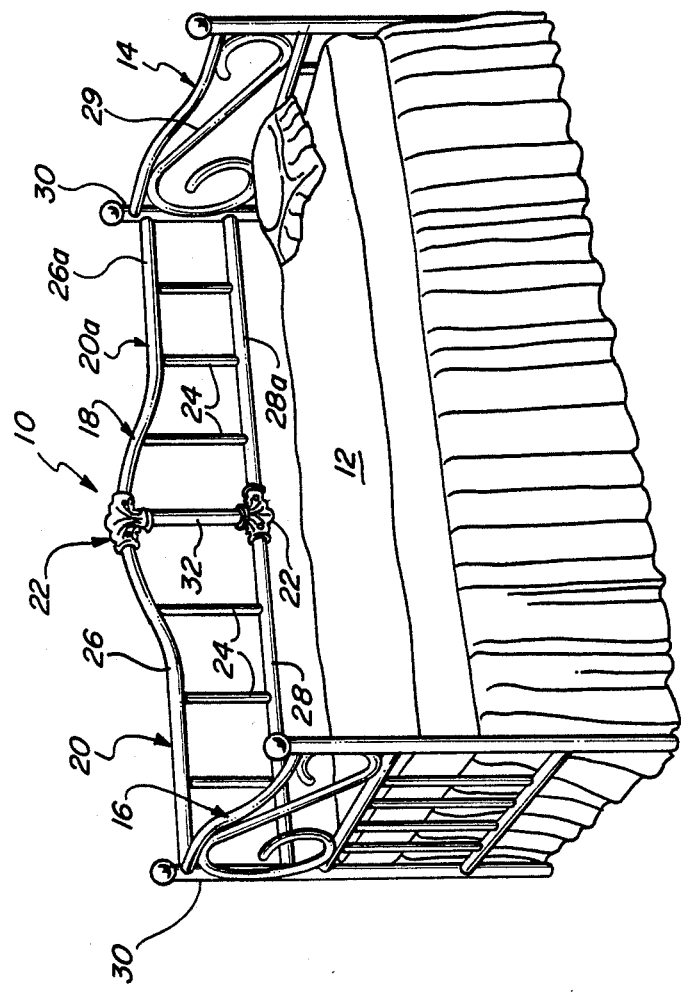

JOINT CONNECTOR FOR HEADBOARD OF SOFA BED OR DAYBED

BACKGROUND OF THE INVENTION

The present invention relates generally to bed structures, and more particularly to a joint connector for the headboard frame member of the well-known sofa bed or daybed, wherein such a bed structure includes a pair of oppositely disposed side-board frame members and a single, elongated, headboard frame member.

Many types of side-board and headboard frame members of various configurations are presently in use. However, the structures of these frame members have features which restrict their use. They also are very expensive to ship due to the difference in sizes between the headboards and companion sideboard members. More specifically, the length of each side-board frame member of a sofa bed is commonly of the same dimension as the width of a single bed mattress, whereas the headboard frame member is constructed as having approximately the same length as the elongated longitudinal side of a single bed or mattress which is substantially twice the length of a side-board member.

Accordingly, the shipping containers presently in use for these board members are sized to readily receive and protect the largest structures which are the headboards. Such large sized containers, however, require more shipping room and thus transportation by ship or truck becomes very costly.

SUMMARY OF THE INVENTION

The present invention comprises a novel arrangement wherein at least two "T" joint connectors are centrally positioned between the distal ends of the elongated headboard frame member of a sofa bed or daybed. As will be hereinafter described in detail, each joint connector allows the headboard member to be shipped in two-piece dismantled sections, each half section having the approximate length of the corresponding side-board frame members.

Thus, the present invention has for an important object a provision wherein the headboard of a daybed can be readily disassembled for shipment to provide two half sections of near equal length so as to generally match the size of the associated side-board members, whereby the disassembling or reassembling is established by at least a pair of connectors interposed between the corresponding half sections.

Still another object of the invention is to provide a "T" type connector having a pair of oppositely positioned cavities or bores formed in a horizontal plane, there being a third cavity or bore extending outwardly at right angles to the horizontal bores and positioned centrally therebetween. Each of the bores has a "dead-end" wall or partition.

It is still another object of the present invention to provide a novel "T" type connector wherein the horizontal bores are adapted to receive respective pre-shaped tubes which define the headboard frame, and wherein the third bore member is adapted to support a vertical tube or bar.

It is still a further object of the present invention to provide a connector of this character wherein a minimum amount of securing screws is required for the assembly of the two half sections of the headboard.

It is another object of the present invention to provide a connector of this type which allows the two matching half sections to be easily assembled with the use of a screwdriver.

It is a further object of the invention to provide a headboard having two half sections which can be readily stored in the same size container or carton as the associated side-board frame members.

A still further object of the present invention is to provide a means whereby a headboard frame member is easily assembled and secured.

Still another object of the invention is to provide a connector that is readily constructed to include any suitable design compatible with the design and usage of the bed.

A further object of the present invention is to provide a device of this character that is relatively inexpensive to manufacture, and is simple yet rugged in construction.

The characteristics and advantages of the invention are further sufficiently referred to in connection with the accompanying drawings, which represent one embodiment. After considering this example, skilled persons will understand that variations may be made without departing from the principles disclosed; and I contemplate the employment of any structures, arrangements or modes or operation that are properly within the scope of the appended claims.

BRIEF DESCRIPTION OF THE DRAWINGS

Novel features and advantages of the present invention in addition to those mentioned above will become apparent to those skilled in the art from reading the following detailed description in conjunction with the accompanying drawings wherein:

FIG. 1 is a pictorial view of a typical type sofa bed or daybed showing the placement of the "T" joint connectors so as to define the oppositely disposed half sections;

FIG. 2 is an enlarged view of the corresponding joint connectors wherein the lower connector is shown in cross section and having respective structural tubes mounted therein;

DESCRIPTION OF THE PREFERRED EMBODIMENT

Figure 3:
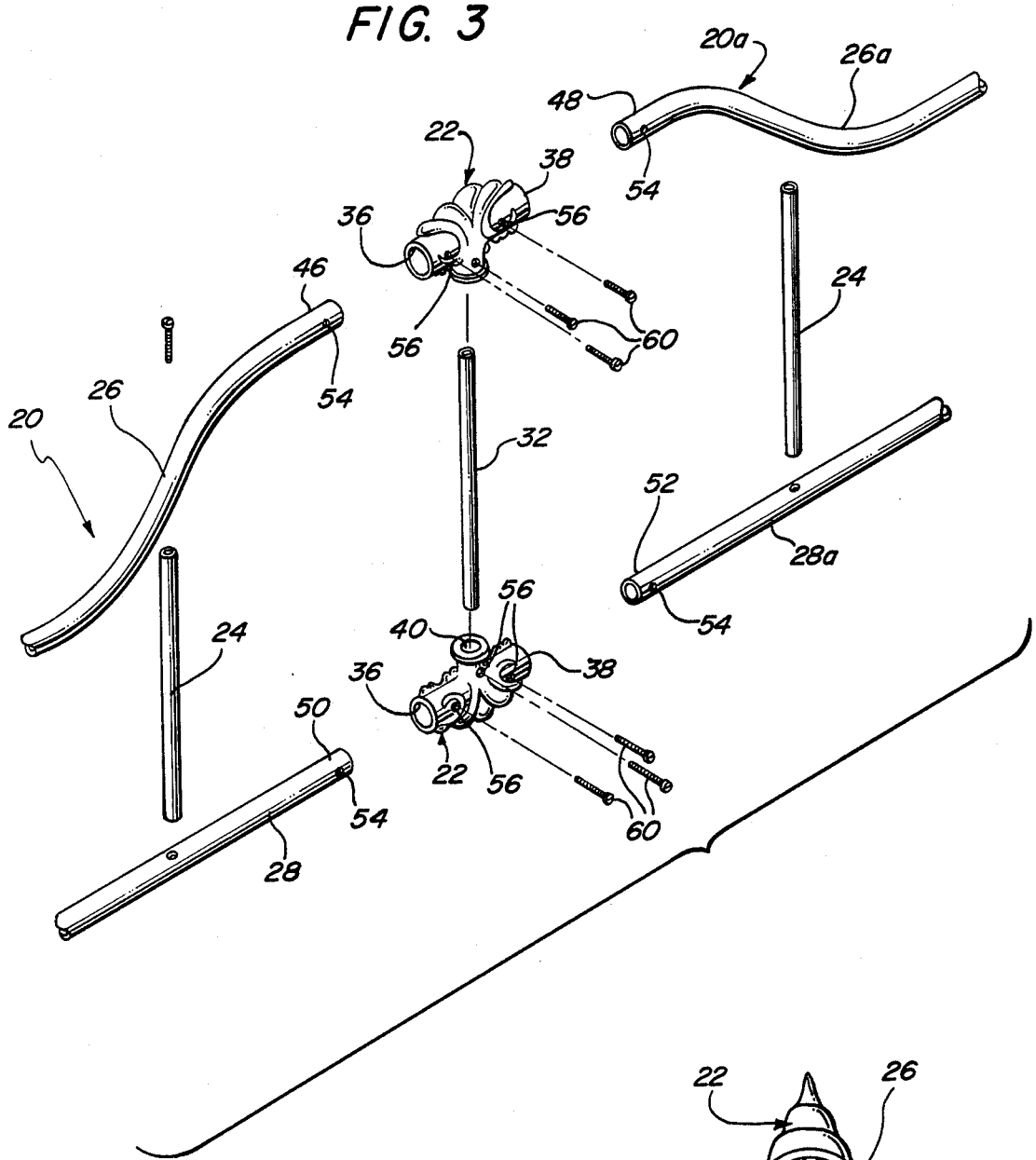
FIG. 3 is a perspective exploded view of the connector joints and the corresponding ends of the frame sections.

Referring more particularly to FIG. 1, there is shown a pictorial view of a sofa bed or daybed, generally indicated at 10, having a typical single bed mattress 12 normally provided with a hidden trundle bed positioned thereunder. Daybeds typically include side-board frame members, indicated generally at 14 and 16, each being secured and positioned adjacent the ends of the bed. A headboard frame member, designated at 18, interconnects each side-board member and extends the full length of the bed, but only along one side thereof, whereby a sofa-type arrangement is established.

Headboard 18 is defined by an elongated frame structure comprising a plurality of extended bars or tube members which are secured together and arranged to establish two connected half-frame sections 20 and 20a constructed with compatible design configurations, as seen in FIG. 1. These two half-frame sections are assembled to form the elongated headboard 18. This is accomplished by employing novel-designed connector means, generally indicated at 22, which secure the half-frame sections together.

Accordingly, each half section must basically include an upper rail, a lower rail, an end post and strut support means for supporting and positioning the upper and lower rails in a substantially parallel relationship to each other.

Half sections 20 and 20a are constructed in the identical manner, each having a pair or rail members defined by upper, horizontally positioned, enlarged tubes 26 and 26a, respectively, and a lower, horizontally positioned, enlarged tubes 28 and 28a, respectfully. The upper and lower tube members are secured in a substantially parallel position with respect to each other by means of any suitable securing structure, as illustrated at 24 in FIG. 1. Thus, for simplicity, vertical tubes or rods 24 are shown being secured between the respective rails 26 and 28, and 26a and 28a. The ends of each half section are provided with vertical posts 30 which are secured to the ends of the upper and lower rails. When the bed frame is erected as illustrated in FIG. 1, side-board frame members 14 and 16 are secured to the respective post members 30.

However, prior to securing side boards 14 and 16 to post 30, half sections 20 and 20a are secured together by connectors 22 to form a complete, single, elongated headboard 18. Thus, a pair of connectors is employed, one connecting the oppositely disposed upper rails members 26 and 26a and the other connector connecting the oppositely disposed, lower rails members 28 and 28a. Further, the two connectors are interconnected by a central strut member 32 which can be formed from a rod or, preferably, a tubular member.

The connectors are formed from a cast metal body 34 (FIG. 2) which has a generally "T" shaped configuration, the outer surface thereof being provided with any suitable design to correspond to the motif of the daybed. Body 34 includes three bores or cavities. Two bores 36 and 38 are axially aligned with each other and have diameters large enough to receive the rail members of the half sections. The third bore 40 is positioned at right angles to bores 36 and 38 and centrally disposed in body 34. Limiting means are provided between the three bores so as to allow each tube being positioned in the respective bore to fit in a predetermined manner for the simple securing of the specific rails therein. The limiting means is defined by inner walls or partitions 42 and 44. Partition 42 is interposed between bores 36 and 38, while partition 44 is positioned above partition 42, thus defining a dead end for bore 40.

Figure 4:
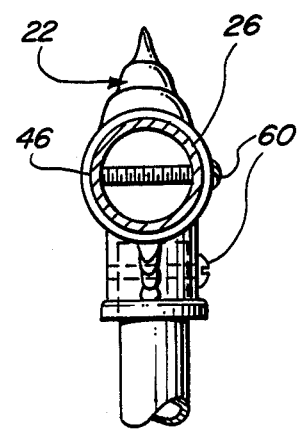
FIG. 4 is a cross-sectional view taken substantially along line 4—4 of FIG. 2.

Each respective connecting end 46, 48, 50 and 52 is provided with a hole 54. These are located so as to be aligned with holes 56 formed in the "T" joint connectors 22. When the rails and strut 32 are properly positioned within the respective bores, holes 54 in connecting ends 46, 48, 50 and 52 will be aligned with the respective holes 56 of the connector 22. After alignment of the holes, screws 60 are inserted therethrough, as shown in FIG. 4. Once this is accomplished, the headboard becomes a single, elongated, frame structure to which side boards 14 and 16 are attached.

The foregoing is a description of a preferred embodiment of the invention which is given here by way of example only. The invention is not to be taken as limited to any of the specific features as described, but comprehends all such variations thereof as come within the scope of the appended claims.

What I claim is:

1. In combination, a sofa bed or a daybed having a frame structure including a pair of oppositely disposed side boards and a headboard wherein said headboard comprises a first half section and second half section, said half sections being secured together to define a single elongated headboard, and connecting means interposed between said half sections to secure said half sections together;
    said connecting means comprising a pair of connectors, each of said connectors being formed with a plurality of bores including end walls therein;
    wherein said connectors are formed with two oppositely disposed and horizontally aligned bores, and a centrally positioned bore located at right angles to said two oppositely disposed bores, wherein corresponding ends of said half sections are fixedly received in said horizontally aligned bores, there being a strut member interconnected between said connectors, the ends of which are secured in the respective right angle bores.

2. The invention as recited in claim 1, including means for fixedly securing said connectors to said half sections and said strut member.

* * * * *